United States Patent [19]

Anderson

[11] 3,946,604
[45] Mar. 30, 1976

[54] METHODS AND APPARATUS FOR DETERMINING CHARACTERISTICS OF SUBSURFACE EARTH FORMATIONS

[75] Inventor: Ronald A. Anderson, Houston, Tex.

[73] Assignee: Schlumberger Technology Corporation, New York, N.Y.

[22] Filed: Oct. 5, 1973

[21] Appl. No.: 403,764

[52] U.S. Cl. .................................................. 73/152
[51] Int. Cl. ............................................ E21b 49/00
[58] Field of Search ............................... 73/152, 151

[56] References Cited
UNITED STATES PATENTS
3,638,484  2/1972  Tixier.................................... 73/152

*Primary Examiner*—Jerry W. Myracle

[57] ABSTRACT

In accordance with illustrative embodiments of the present invention, measurements of a plurality of earth formation parameters are combined in a new manner to establish Poisson's ratio for the formations surrounding a borehole which is useful for identifying mechanically competent formations.

6 Claims, 4 Drawing Figures

METHODS AND APPARATUS FOR DETERMINING CHARACTERISTICS OF SUBSURFACE EARTH FORMATIONS

BACKGROUND OF THE INVENTION

1. Field of the Invention

The control of sand production in a well is a problem that has been with the oil industry for a very long time. Experience indicates that sanding problems are directly related to production rates of the well. Therefore, the problem of sanding has become more critical lately since proration control by the government has been substantially eliminated due to shortages. Consequently, the oil companies are concerned with substantially increasing production of their wells. In fact, the government is actually requiring an increase of production in Federal waters. It is therefore apparent that oil producing companies would like to know the maximum rate at which they can produce without sanding from wells in which no consolidation or gravelpack has been used. Furthermore, oil companies would be very interested in knowing which wells require gravelpacking or consolidation from the very beginning of production, so that control measures can be instituted from the start. Since there are friable sand reservoirs in known sand producing areas from which economically attractive production rates may be obtained without the use of any form of sand control, it is desirable that some means for distinguishing or predicting those competent sand formations from incompetent sand formations be available so that sand controlling techniques such as gravelpacking or plasticizing may be avoided when unnecessary, or, on the other hand, may be resorted to before sanding problems develop from over production in those formations where such sand control is necessary.

2. Description of the Prior Art

In seeking information concerning zones bearing hydrocarbons such as oil and gas that may exist in subsurface earth formations adjacent a borehole drilled into these formations, various types of exploring devices are typically lowered into the borehole for measuring selective properties of the formations adjacent the borehole. Three principal types of such exploring devices are (a) electrical exploring devices (using either electrodes or induction coils), (b) sonic exploring devices, and (c) radioactivity exploring devices.

The electrical exploring devices measure the electrical resistivity or conductivity of the earth formations. Such electrical resistivity is determined primarily by the amount, distribution and resistivity of the fluids contained in the formation core spaces. The sonic exploring devices, on the other hand, measure the time required for sonic waves to travel across a given span of the earth formation which is related to the sonic velocity of the formation. This sonic velocity is determined primarily by the nature of the rock matrix and particularly its porosity, the state of confining stress and the type of fluid in the pore space.

The radioactivity exploring devices measure either the natural radioactivity of the formation or the radioactivity induced therein by bombardment of the formation with radioactivity particles or rays. Two particular radioactivity exploring devices used to investigate formations are the formations density logging tool and the neutron logging tool. The formation density logging tool emits gamma rays which are diffused through the formation and the number of diffused gamma rays reaching one or more nearby detectors are counted to provide a measure of the electron density of the adjacent formation. Moreover, it is known that this electron density is very closely proportional to the bulk density of the formation in substantially all cases.

The neutron tool, on the other hand, utilizes a source for emitting neutrons into adjacent formations. In one form of neutron device, these neutrons lose energy by collision with atoms of the formation. When the energy level of these neutrons is reduced to the epithermal energy range, they can be detected by a nearby detector which counts the number of epithermal neutrons. Since hydrogen atoms are the only ones whose weights are almost equal to that of the neutron, they are the most effective in reducing the energy level of the neutrons to enable their capture. Thus, it can be said that this type of neutron log is essentially a record of the hydrogen atom density of the rocks surrounding the borehole. Since the formation pore spaces are generally filled with water or fluid hydrocarbon, both of which have about the same amount of hydrogen, a neutron log does not distinghish between oil and water, but is primarily affected by the formation porosity. Gas, on the other hand, will alter this porosity determination by the neutron log.

In general, none of the electrical, acoustic, or radioactivity measurements taken alone give all of the required information concerning the hydrocarbons in the formations or the characteristics of those formations. The various factors which affect each measurement are taken into account and then an interpretation or deduction is made as to the probable characteristics of the formations.

There is considerable experimental evidence which indicates that there is a correlation between the intrinsic strength of a formation and the dynamic elastic constants of the formation as determined from sonic velocity and density measurements. One technique which attempts to predict the competency of sand and thereby also predict the maximum rate at which a well may be produced is described in a paper, "Estimation of Maximum Production Rates from Friable Sandstones Without Using Sand Control Measures", by N. Stein and V. W. Hilchie, Paper No. SPE 3499 published by the American Institute of Mining, Metallurgical and Petroleum Engineers Inc. Copyright 1971. According to this paper, the shear modulus is the most important elastic constant for predicting sanding problems, however, the technique described in the paper is based on the assmmption that the bulk modulus is constant throughout the formation. In general, the bulk modulus varies throughout the formation and this technique would not provide accurate results.

It is possible to obtain the mechanical properties or elastic constants of the formation, such as the shear modulus and bulk modulus (or bulk compressibility) from the value of Poisson's Ratio. Heretofore Poisson's ratio was determined from the sonic shear and compressional velocities, while the sonic compressional velocity which is generally referred to as the acoustic travel time of the formation is readily measured as described above, the sonic shear velocity, is highly attenuated. The sonic shear velocity approaches the velocity of the fluid in the formation, and shear arrivals are often masked in the sonic wave trains making it extremely difficult to measure.

Clearly a need exists for readily determining values for Poisson's ratio which can then be used to determine the mechanical properties and strength of a formation.

SUMMARY OF THE INVENTION

In accordance with the invention, well-logging measurements are combined to produce a parameter indicative of the shaliness of the formation, which is referred to as the shale index. The shale index is then used to compute Poisson's ratio. The invention can be carried out using an approximately programmed general purpose digital computer or a special purpose analog computer.

DESCRIPTION OF THE PREFERRED EMBODIMENT

Figure 1:
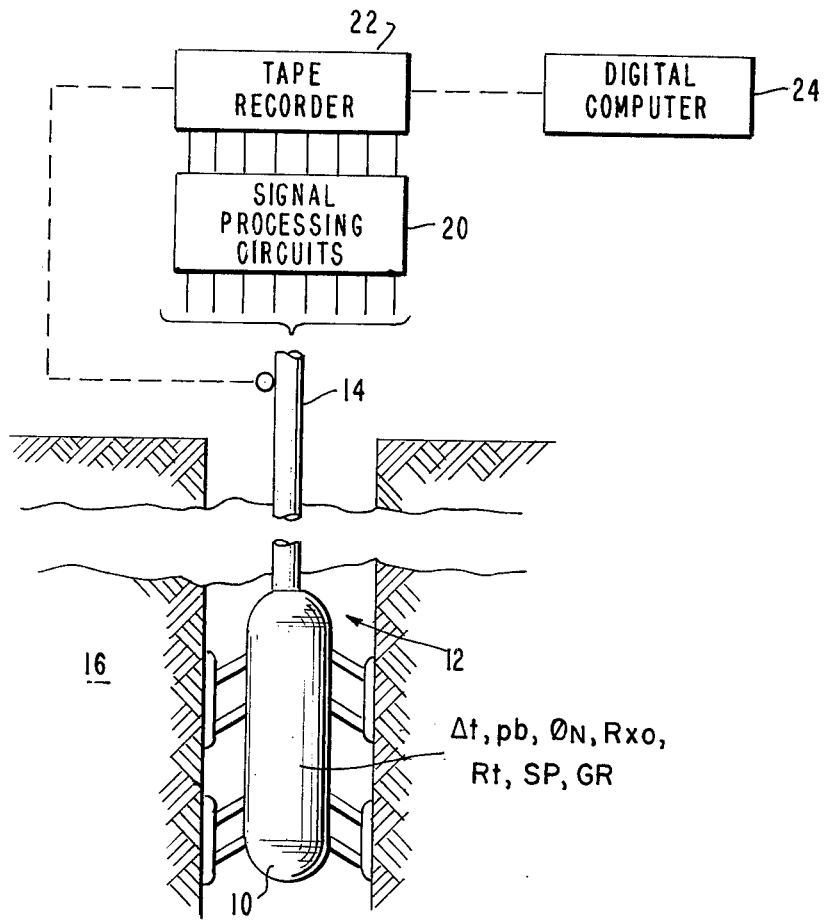
FIG. 1 shows an investigating apparatus suspended in a borehole for deriving a plurality of well-logging measurements and a schematic representation of apparatus for processing these well-logging measurements.

Referring to FIG. 1, there is shown an investigating apparatus 10 located in a borehole 12 on the end of multiconductor cable 14 which is raised and lowered in borehole 12 drilled into earth formation 16 by a suitable winch mechanism (not shown). Investigating apparatus 10 includes exploring devices for obtaining measurements of the acoustic travel time $\Delta t$, bulk density $\rho_b$, deep and shallow resistivities, $R_{xo}$ and $R_t$, spontaneous potential SP, porosity, $\phi_n$, derived from a neutron exploring device and the natural gamma ray count, GR, of the formation.

Measurement signals derived from the exploring device 10 are transmitted to the suitable signal processing circuits 20 at the surface of the earth. The signal processing circuits convert the well-logging signals to digital form for temporary storage by way of a digital tape recorder 22 for application to a computer 24 which is programmed in accordance with the teachings of the present invention to process the data in a manner to provide valuable information relative to the nature of the earth formations. It should be appreciated at this point that the digital computer 24 could either be a truck mounted computer for operation at the well site, or the data could be transmitted via a telephone communication or other technique to a computer located some distance away. If the data was recorded on a magnetic tape by way of tape recorder 22, of course, the tape containing the data could be simply directly transported to the distant computer for processing. While the measurements to be used in practicing the present invention are shown in FIG. 1 as having been derived from one exploring device, it should also be understood that these measurements could be derived from a plurality of exploring devices which are run through the borehole at different times. In this event, the data from each run would be recorded on individual magnetic tapes and the total data would then be merged for use by digital computer 24. Such merging may preferably be accomplished by merging all of the data on a single tape for processing by the digital computer. Alternatively, the data could be processed using a special purpose analog computer.

An acoustic exploring device for deriving a measurement for $\Delta t$ can be found in U.S. Pat. No. 3,231,041 granted to F. P. Kokesh on Jan. 25, 1966. An exploring device for obtaining the measure of the bulk density can be found in U.S. Pat. No. 3,321,625 granted May 23, 1967 to John F. Wall. An exploring device for obtaining resistivity measurements and measurements of the spontaneous potential can be found in U.S. Pat. No. 3,053,530 granted to G. Attali on July 1, 1969. An example of an exploring device for obtaining a neutron porosity log measurement can be found in U.S. Pat. No. 2,769,918 granted to C. W. Tittle on Nov. 6, 1956.

The neutron tool responds to the amount of hydrogen in the formation, and is essentially a record of the hydrogen atom density in the rocks surrounding the borehole. Liquid hydrocarbons have hydrogen indexes close to that of water and neutron measurements in these formations are primarily affected by porosity. Gas, however, usually has a considerably lower hydrogen concentration which varies with temperature and pressure. Therefore, when gas is present near enough to the borehole to be within its zone of investigation, a neutron log does not provide an accurate measure of formation porosity.

In addition to deriving a measure of formation porosity from the neutron tool, the bulk density and acoustic travel time measurements can also be converted to measurements of formation porosity. The bulk density measurement can be converted to a porosity measurement if the matrix density $\rho_m$ and fluid densities $\rho_f$ are known. The equation for converting this bulk density measurement to a porosity measurement is:

$$\phi_D = \frac{\rho m - \rho b}{\rho m - \rho f} \quad (1)$$

See pages 43 and 44, "Log Interpretation Principles," published by Schlumberger Limited, New York, New York 10017 which is incorporated herein by reference. Common values of $\rho$ m for various formations are:

2.71 for limestone
2.87 for dolmite

In water sands, the fluid density $\rho$ f is usually set equal to 1. However, in light hydrocarbon and gas bearing formations, the fluid density $\rho$ f will be less than one, and thus the value of porosity $\phi_D$ derived from the density tool will be higher than the true porosity.

The acoustic travel time $\Delta$ t can also be converted to a measure of porosity provided the acoustic travel time of the rock matrix and fluid, $\Delta t_m$ and $\Delta t_f$ respectively are also known. The relationship of the acoustic or sonic derived porosity in terms of $\Delta$ t is:

$$\phi_s = \frac{\Delta t - \Delta tm}{\Delta t_f - \Delta tm} \quad (2)$$

See pages 36 and 37, "Log Interpretation Principles", heretofore mentioned.

The spontaneous potential measurement provided by the exploring apparatus 10 is the difference between the potential of an electrode on the exploring device and the potential of an electrode located at the surface of the earth. Opposite shale formation, spontaneous potential will usually remain fairly constant and thus tend to follow a straight line on the log, called the "Shale Base Line". Opposite permeable formations a spontaneous potential will show excursions from the shale base line. In thick permeable beds free of shale, the spontaneous potential will also reach an essentially constant value defined as the "Sand Line". For further information concerning the spontaneous potential measurement and its uses, see pages 7-12 of the referenced publication "Log Interpretation Principles".

In accordance with a copending patent application entitled Method and Apparatus for Investigating Subsurface Earth Formations, filed by Anderson et al on Oct. 5, 1973, Ser. No. 403,786, elastic constants or elastic modulii of the formation are computed using Poisson's ratio which, in turn, provide useful information regarding the strength of the formation.

Heretofore, Poisson's ratio could be determined in accordance with:

$$\nu = \frac{1-2(V_s/V_c)^2}{2[1-(V_s/V_c)^2]} \quad (3)$$

where:
$\nu$ = Poisson's ratio
$V_s$ = sonic shear velocity
$V_c$ = sonic compressional velocity
and used to determine the elastic constants. In practice, this method did not yield reliable or accurate results owing to the difficulty in determining the sonic shear velocity.

After detailed investigation and experimentation, it has been found that the Poisson's ratio can be related to the shale content or shaliness of the formation according to the following equation:

$$\nu = 0.125q + 0.27 \quad (4)$$

where $q$ is the shaliness index defined as:

$$q = \frac{\phi_z - \phi_e}{\phi_z} \quad (5)$$

where $\phi_z$ is the total space between the matrix grains supporting the overburden, and $\phi_e$ is the porosity available to water and hydrocarbons. The difference, $\phi_z - \phi_e$, is interpreted as the intergranular space occupied by dispersed shale and fine in sands.

As discussed below, to arrive at values for $\phi_z$ and $\phi_e$ in the presence of hydrocarbons, a complete analysis of the formation is required. When hydrocarbons are not present, $\phi_z$ is equal to the sonic porosity $\phi_S$, $\phi_e$ is equal to the density porosity $\phi_D$ and Eq. 5 can be written as:

$$q = \frac{\phi_S - \phi_D}{\phi_S} \quad (6)$$

By using the results of equation (4), the elastic constants, bulk compressibility and shear modulus can be determined in accordance with the techniques disclosed in the above referenced Anderson et al copending application.

To obtain the value of Poisson's ratio it is therefore only necessary to determine the value of the shaliness index. In the presence of hydrocarbons this requires a complete analysis of the formation. A technique for obtaining the value of the shaliness index is set forth in detail in U.S. Pat. No. 3,638,484 issued on Feb. 1, 1972 to Tixier and assiged to Schlumberger Technology Corporation, and in a paper entitled "Log Evaluation of Low-Resistivity Pay Sands in the Gulf Coast" by M. P. Tixier, R. L. Morris and J. G. Connell, presented at the SPWLA Ninth Annual Logging Symposium, June 23rd-26th, 1968. Another technique is set forth in a publication entitled "Log Analysis of Sand-Shale Sequence — A Systematic Approach", by Poupon et al, published in the July, 1970 issue of the Journal of Petroleum Technology where the shaliness index is $V_{sh}$.

By utilizing the techniques fully explained in the Tixier patent and Tixier et al publication, values for $\phi_e$, $\phi_z$, q, $C_p$, the sonic compaction factor and $S_{gxo}$ the gas saturation near the borehole wall are obtained for each depth level in the formation. Since these techniques are fully explained in the above referenced patent and publication, they will not be discussed in detail herein.

The values of q at each depth level thus obtained are then utilized in equation 4 to compute Poisson's ratio.

Figure 2:
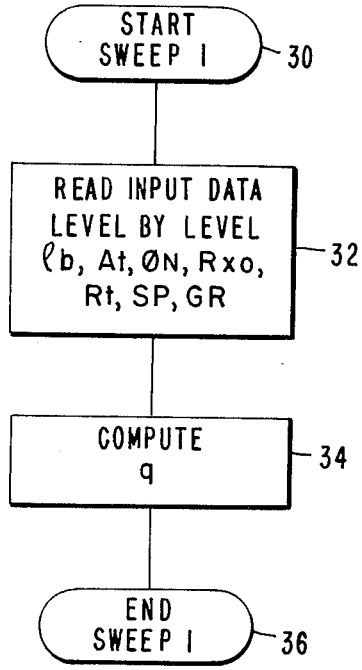
FIGS. 2 and 3 are diagramatic representations of computer program flow charts for carrying out the invention utilizing a general purpose digital computer.

Referring now to FIG. 2, there is shown a flow diagram for implementing this invention through the use of an appropriately programmed digital computer. Poisson's ratio is computed by running two sweeps through the data. The first sweep is used to obtain values for q at each depth level using the techniques of the above-referenced Tixier patent. This value is then used in a second sweep to compute the value of Poisson's ratio for each depth level. The output of the program can be a listing of q and Poisson's ratio computed for each depth level or a log showing the continuous variation of these parameters as a function of depth.

The first sweep of the program is entered, block 30, and the data derived from the well-logging tool is read on a level-by-level basis, block 32. Values for q are computed for each depth level, block 34, using the techniques disclosed in the referenced Tixier patent and the first sweep ends, block 36.

Figure 3:
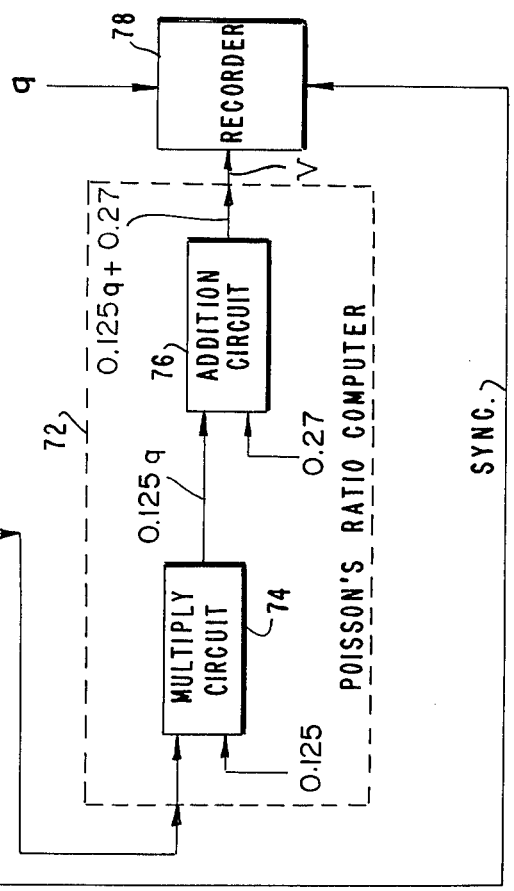

Sweep 2 is shown in FIG. 3. The sweep is entered, via block 40, after which the input parameter for the first depth level, q, computed in sweep 1 is read, block 42. Next, Poisson's ratio is computed using equation 4, block 44. If this is not the last depth level, NO answer from decision element 46, the depth level is incremented by one, block 54, the program returns to block 42 to analyze the next depth level. When all the depth levels have been analyzed, YES answer from decision element 46, values for q and Poisson's ratio are printed out for each depth level in the borehole, block 48. If a continuous log is required, YES answer from decision element 50, the log is printed out, as represented by block 52, and in either case, the program exits block 62.

Figure 4:
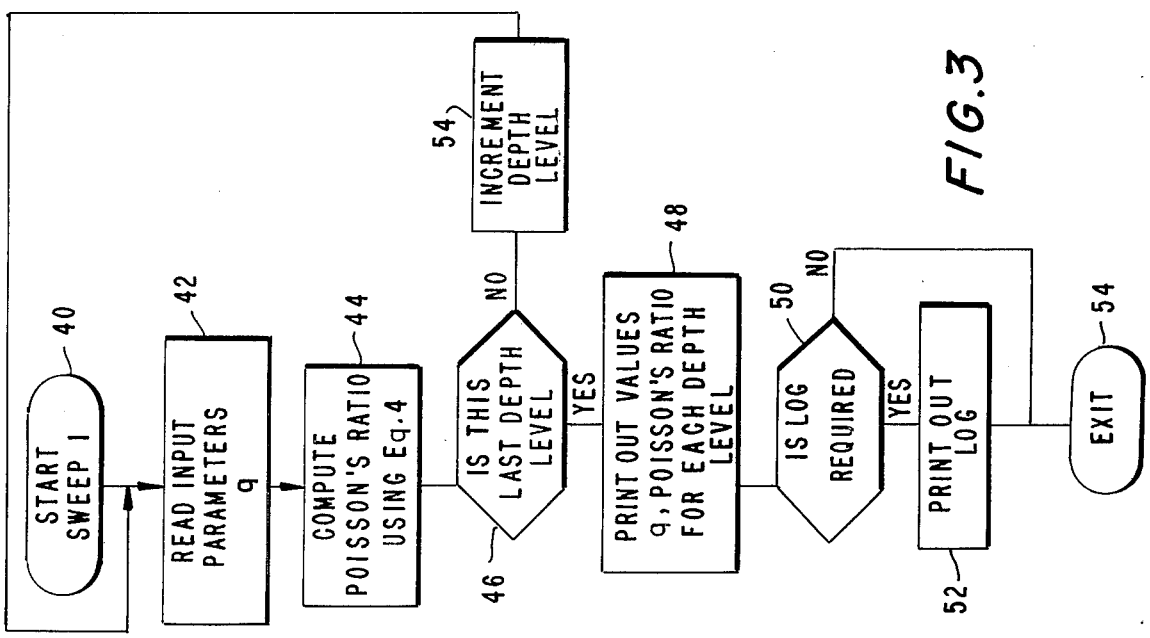
FIG. 4 is a diagramatic representation of a special purpose analog computer for practicing the invention.

Referring now to FIG. 4, there is shown a special purpose analog computer for carrying out the invention. It will be understood that prior to utilizing the analog computer shown in FIG. 4, the well-logging data derived from the borehole is processed in accordance with the techniques of the Tixier U.S. Pat. No. 3,638,484 to provide values for q, for each depth level of the formation and that these values are stored on magnetic tape for playback on tape recorder playback 70.

The value of q computed during the prior computation is applied from tape recorder playback 70 to Poisson Ratio Computer 72 which contains conventional circuits for computing the value of Poisson's ratio in accordance with the equation 4. As shown in greater detail in FIG. 6, the value of q is first applied to a multiply circuit 74 where it is multiplied by a signal proportional to a constant 0.125. The resultant product, 0.125$q$, is added to a signal proportional to 0.27 in addition circuit 76 to produce the signal 0.125$q$ + 0.27 which is equal to Poisson Ratio.

The computed values of Poisson's ratio and $q$ are applied to a recorder 78 which produces a continuous recording of the variables as a function of depth. The recorder is controlled by a signal from the tape recorder playback to insure that its operation is synchronized with the tape recorder drives.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What I claim is:

1. A machine method of determining characteristics of an earth formation traversed by a borehole, comprising the steps of:
   a. providing a plurality of well-logging measurements, indicative of a plurality of properties of the formation at selected depth levels;
   b. combining said measurements to provide a first parameter indicative of the shale content of the formation at selected depth levels; and
   c. producing a representation of Poisson's ratio from said first parameter at selected depth levels.

2. The method of claim 1 wherein the parameter indicative of the shale content of the formation is the shale index.

3. The method of claim 2 wherein Poisson's ratio is computed according to:
$$\nu = Aq + B$$
Where:
A and B are constants, $q$ is the shale index, and $\nu$ is Poisson's ratio.

4. Apparatus for determining characteristics of an earth formation traversed by a borehole, comprising:
   a. means for providing a plurality of well-logging measurements indicative of a plurality of properties of a formation at selected depth levels;
   b. means for combining at least some of said measurements to provide a first parameter indicative of the shale content of the formation at selected depth levels; and
   c. means for producing a representation of Poisson's ratio from said first parameter at selected depth levels.

5. The apparatus of claim 4 wherein the parameter indicative of the shale content of the formation is the shale index.

6. The apparatus of claim 5 wherein Poisson's ratio is computed according to:
$$\nu = Aq + B$$
Where:
A and B are constants, $q$ is the shale index, and $\nu$ is Poisson's ratio.

* * * * *